March 9, 1943. B. WINER 2,313,692
MULTIPHASE CONTINUOUS FAT TREATING
Filed Jan. 29, 1941 2 Sheets-Sheet 1

INVENTOR.
Baruch Winer
BY
ATTORNEYS

INVENTOR.
Baruch Winer

Patented Mar. 9, 1943

2,313,692

UNITED STATES PATENT OFFICE 2,313,692

MULTIPHASE CONTINUOUS FAT TREATING

Baruch Winer, New York, N. Y.

Application January 29, 1941, Serial No. 376,445
In Rumania March 22, 1940

4 Claims. (Cl. 260—415)

This invention relates to the hydrolysis or splitting of glycerides, as for example vegetable and animal oils and fats.

It is an object of the present invention to provide an improved continuous counter-current method of effecting splitting or hydrolysis.

It is a further object of the invention to provide an improved process of hydrogenation and fat splitting.

In accordance with the method of the present invention, a body of glyceride, as for example fat or oil, is passed upwardly in a column against a downwardly flowing stream of water. Both the water and glyceride are maintained at a fat splitting temperature, the pressure being such as is necessary to maintain the water in a liquid condition at the desired temperature. During this process an emulsion is formed containing water, glycerine and a fat or oil component, and at each of a plurality of stations the emulsion is separated into a fatty or oily component and a glycerine-water component, this separation being effected by passing the emulsion into contact with a porous filtering medium. At the same time the upward passage of the glycerine-water component is arrested and said component is caused to pass downwardly and the fatty component is caused to pass upwardly. In this way a plurality of separate fat splitting zones are established and maintained, these zones being separated by the emulsion separating stations. By preventing the passage of the separated glycerine-water component from a lower to an upper splitting zone, the concentration of glycerine in the water in the several zones is decreased and the fat splitting activity of the water therein is increased.

In other words, at each separating station the emulsion is separated into its glycerine-water component and fatty component. The glycerine-water component is returned to the immediately preceding or lower splitting zone and the fatty component is passed to the next succeeding or upper zone. Preferably the water is sprayed or finely divided in its downward passage through the tower, and in order to properly maintain this condition the water at each separating zone is collected and re-sprayed into the next lower zone. Preferably, also, the fat or oil is sprayed into the tower at the bottom thereof and at each separating zone is re-sprayed upwardly. This may be accomplished by causing it to pass through nozzles or orifices which impart a swirling movement to said oil or fat.

In accordance with that phase of the invention dealing with the improved process of hydrogenation and splitting, not only is the emulsion above described separated into its fatty component and its glycerine-water component at each of a plurality of stations, but the glyceride at each of said stations is also hydrogenated. The hydrogenation function may be accomplished by employing a porous filtering medium which performs not only the function of separating the emulsion into its components but also the additional function of hydrogenation in the presence of hydrogen gas introduced into the column. Furthermore, the glyceride, prior to its introduction into the column, may be partly or wholly hydrogenated by passing counter-currently to or concurrently with a stream of hydrogen at a hydrogenation temperature in the presence of a suitable hydrogenation catalyst, and then without cooling and without exposure to the air the still hot, hydrogenated glyceride may be introduced into the fat or oil splitting column.

The principles of the invention will be described in the claims and will be illustrated in the following detailed description taken in conjunction with the accompanying drawings, in which:

Figure 1:
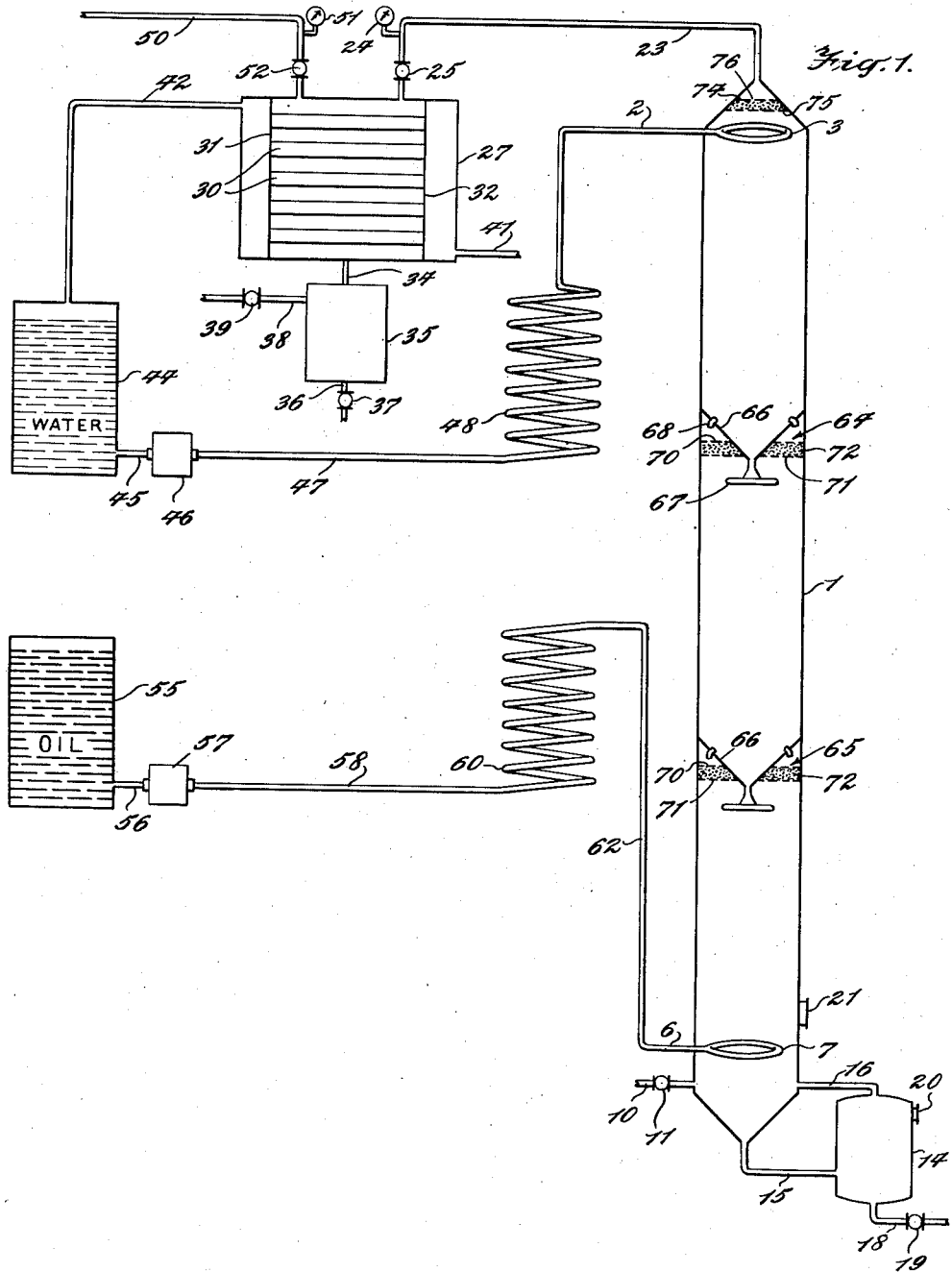
Fig. 1 is a diagrammatic view showing the splitting column, means for heating the glyceride and the water and for cooling the fatty acids under controlled pressure.

Referring specifically to the several views in which like parts are indicated as far as possible by like numerals, and referring first to Fig. 1, the column 1 is provided with an inlet 2 for hot water terminating in a spray head 3 and an inlet 6 for glyceride terminating in spray head 7. At the bottom of the column there is an inlet 10 for hydrogen provided with valve 11. There is also provided adjacent the bottom of the column 1, a separating vessel 14 connected with the column 1 by pipes 15 and 16. The vessel 14 is equipped with draw-off pipe 18 provided with valve 19. The vessel 14 is further equipped with an inspection glass 20 and the column 1 is provided with a similar glass 21. From the top of the column, pipe 23 provided with pressure gauge 24 and regulating valve 25 leads to heat exchanger 27. This comprises a series of tubes 30 connected at their ends to the tube sheets 31 and 32. Pipe 34 leads from the bottom of the exchanger to tank 35 provided at the bottom with draw-off pipe 36 having valve 37, and adjacent the top with pipe 38 and valve 39. The heat exchanger 27 also has water inlet pipe 41 and water outlet pipe 42, the latter leading to water tank 44. From the tank 44 pipe 45 leads to pump 46, from which pipe 47 leads to heating coil 48 connected to pipe 2 which is the inlet pipe for water to the column 1. The heat exchanger 27 is further equipped with hydrogen eduction pipe 50 provided with pressure gauge 51 and valve 52. From the oil storage tank 55 pipe 56 leads to pump 57, from which pipe 58 leads to heating coil 60. From the coil 60 pipe 62 leads to glyceride inlet pipe 6.

Figure 4:
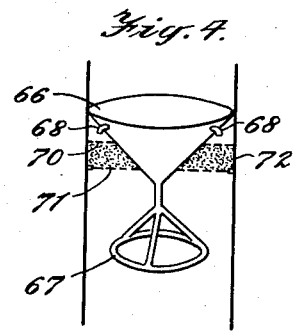
Fig. 4 is an enlarged diagrammatic view of a means for separating the emulsion at each of a plurality of stations and for re-mixing or spraying the water and glyceride at each of those stations.
Figure 6:
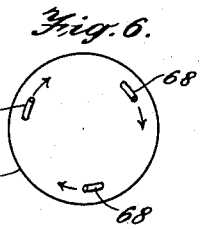
Fig. 6 is a diagrammatic plan view of the enlarged view shown in elevation in Fig. 4.

Within the column 1 are located two separating and re-spraying stations indicated generally as 64 and 65, and shown in greater detail in Figs. 4 and 6. Each of these includes a collecting funnel 66 equipped with a spray head 67 at the bottom thereof and also with tangentially arranged nozzles 68, the funnels being secured to and supported by the wall of the column. There is also provided at each of the stations 64 and 65 a pair of perforated plates 70, 71 secured to the column wall and supporting therebetween a porous filtering mass 72 which, when hydrogenation inside the column is desired, performs not only a filtration but also a hydrogenating function, and for such hydrogenating function comprises a suitable hydrogenation catalyst, as for example nickel. For example, nickel wool may be employed in order to accomplish both an emulsion separating and hydrogenating functions. At the top of the column there are also preferably placed a pair of perforated plates 74, 75 supported by the column wall and carrying therebetween a similar porous filtering medium 76.

Figure 2:
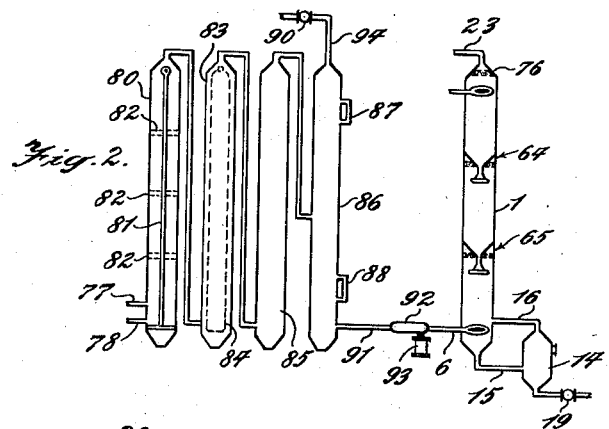
Fig. 2 shows diagrammatically a column similar to that shown in Fig. 1 in conjunction with a series of columns for effecting hydrogenation of the glyceride prior to its introduction into the glyceride splitting column.

Referring to Fig. 2, the column 1 therein is constructed similarly to the column shown in Fig. 1, having separating and/or hydrogenating stations 64 and 65 and a porous filtering mass 76 adjacent the top of the column, an outlet 23 for fatty acids and an inlet 6 for glyceride, together with a separating tank 14 equipped and connected to the column 1 as shown in Fig. 1. At the left of Fig. 2 is shown a series of hydrogenation columns. Column 80 contains a mass of hydrogenating catalyst in the form of nickel splinters. It is also equipped with a rod 81 provided with a series of pleats 82 for the purpose of withdrawing the nickel splinters from the column 80 after the catalyst is spent. It will of course be understood that the column will be provided with suitable opening means at the bottom thereof to permit this withdrawal, this means being not specifically shown.

In column 83 the catalyst, for example nickel splinters, is supported therein within an elongated perforated basket 84. The basket containing the catalyst may be withdrawn from the column when the catalyst is spent. A suitable opening, not specifically shown, is provided to permit this withdrawal. Column 85 may be equipped with a catalyst by means similar to that shown in column 80 or column 83. Column 86 is a separating column provided with gauges or inspection means 87, 88, to indicate the levels of the glyceride and hydrogen gas, respectively. From the column 86 pipe 91 leads to pump 92 driven by motor 93 and discharging the hydrogenated glyceride through inlet pipe 6 into the column 1.

Figure 3:
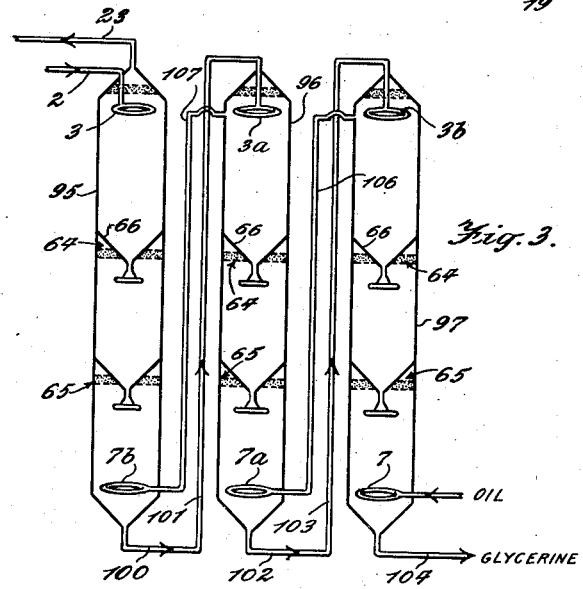
Fig. 3 shows a series of columns constructed similarly to the column shown in Fig. 1 and intended for operation in series.

Referring to Fig. 3, the columns shown here are constructed and equipped as shown in Fig. 1, these columns being connected together in series and therefore providing in effect a single column having a larger number of separation stations than shown in Fig. 1. The column 95 is equipped with water inlet pipe 2 and spray head 3 and a bottom outlet 100 connected to pipe 101 which terminates in spray head 3a in column 96. Column 96 has an outlet 102 at the bottom thereof connected to pipe 103 which terminates in the spray head 3b at the top of column 97. Column 97 has an outlet 104 at the bottom thereof and it will be understood that the pipe 104 is connected to a separation tank 14 equipped as shown in Fig. 1, and also connected to column 97 in the same manner that tank 14 is connected to column 1 in Fig. 1. Glyceride inlet 6 terminating in spray head 7 is located at the bottom of column 97. From a point adjacent the top of column 97 pipe 106 leads to column 96 and terminates in spray head 7a at the bottom thereof, and in like manner from a point adjacent the top of column 96 pipe 107 leads to column 95 and terminates in a spray head 7b at the bottom thereof. From the top of column 95 fatty acid outlet pipe 23 leads to a heat exchanger, and it will be understood that this will be constructed substantially as shown in Fig. 1. It will also be understood that water and oil tanks, pumps and heating coils will be arranged in substantially the same manner and for the same purposes as shown in Fig. 1, to heat the glyceride and water, respectively, the heated water entering the column 95 through the pipe 2 and the heated glyceride entering the column 97 through the inlet 6. Thus the columns 95, 96 and 97 are arranged for counter-current flow of glyceride and water in substantially the same manner as that flow occurs in the single column shown in Fig. 1.

Figure 5:
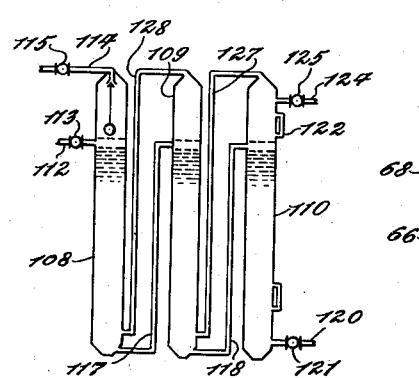
Fig. 5 shows a series of columns for effecting prehydrogenation by passing glyceride and oil counter-currently as contrasted with the apparatus for concurrent flow illustrated in Fig. 2.

Referring to Fig. 5, the columns 108, 109 and 110 are arranged for the counter-current flow of glyceride and hydrogen prior to introduction into a column 1 as shown in Fig. 2. The column 108 has a glyceride inlet 112 provided with valve 113, adjacent the top thereof, and at the top a hydrogen outlet pipe 114 provided with valve 115. From the bottom of column 108 pipe 117 leads to column 109, from the bottom of which pipe 118 leads to column 110. Adjacent the bottom of column 110 outlet pipe 120 equipped with valve 121 is provided. At the top of column 110 there is provided an inspection gauge or glass 122 and a hydrogen inlet pipe 124 provided with valve 125. From the top of pipe 110 pipe 127 leads to an inlet adjacent the bottom of column 109. From the top of column 109 pipe 128 leads to an inlet adjacent the bottom of column 108.

Having described and illustrated apparatus in which the processes of the invention may be carried out, illustrative embodiments of those processes will now be described.

Water from the tank 44 and glyceride from the tank 55 are passed by means of pumps 46 and 57, respectively, through heating coils 48 and 60, respectively, and are delivered to the column 1 (see Fig. 1) through pipes 2 and 6 connected to sprays 3 and 7, respectively. For the sake of simplicity the glyceride will be referred to as oil. In the heating coils the water and oil are heated to a temperature sufficient to maintain the water and oil in the column 1 at an oil splitting temperature, the range of which will vary and in typical instances may be between about 480° F. and 570° F. The pressure in the tower, maintained therein by means of valves 25 and 19, will be sufficient to maintain the water substantially in the liquid phase at these high temperatures, and the flow of water and oil in the column 1 is counter-current.

In the zone of column 1 between the stations 65 and the spray 7, an emulsion composed of a fatty component and a glycerine-water component is formed. This emulsion, by contact with the porous filtering mass 72, is separated into its fatty component and its glycerine-water component. The fatty component continues to pass upwardly and in so doing is forced through the tangentially arranged nozzles which imparts to the fatty component a swirling motion serving to re-spray it into the descending mass of water in the zone immediately above the separation station 65. The separated glycerine-water component is arrested by the porous filtering mass 72 and is caused to pass downwardly from the station 65. At the same time water passing downwardly from the station 64 to the station 65 is collected in the funnel 66 and in its further downward passage is forced through the spray 67 and thereby re-sprayed into the zone below the station 65. A similar process occurs at the station 64. It will therefore be apparent that at each separating and re-spraying station the upwardly moving emulsion is separated into its fatty component and glycerine-water component. The fatty component passes upwardly from said station into the counter-currently descending stream of water, whereas the separated glycerine-water component instead of passing upwardly is arrested and caused to pass downwardly. It therefore follows that upward movement of the separated glycerine-water component into the successive zones is prevented in the concentration, and therefore the fat splitting activity of the water in each of said zones is increased.

As many of the separating stations as desired may be provided either in the same column, as shown in Fig. 1, or in a series of connected columns, as shown in Fig. 3. The increase of fat splitting activity in the several zones is such that with an apparatus as shown in Fig. 1 having three fat splitting zones it is possible to obtain at a pressure of about 300 pounds per square inch and a temperature of about 400° F., an efficiency of splitting or hydrolysis of about 99 percent, particularly if a hydrolytic catalyst such as zinc oxide or caustic soda be employed. The hydrolysis results in a solution of glycerine which collects in tank 14 and is removed therefrom through the pipe 18. Any fatty material mixed with the glycerine solution will separate therefrom in the tank 14 and return to the column through the pipe 16. From the top of the column and after passing through the porous filtering mass 76 at the top thereof, the fatty acid passes through the pipe 23 into the heat exchanger 27, the pressure therein being reduced to any desired extent which may, for example, be about 90 pounds per square inch, by means of pressure reducing valve 26. In the heat exchanger the pressure of the fatty acid is reduced, as also is its temperature, the cooling effect being obtained by water passing into the heat exchanger through the pipe 41 and out of the exchanger through the pipe 42. The cooling water is, of course, heated by heat exchange with the hot fatty acid and is led from the pipe 42 to the tank 44. Upon reducing the pressure of the fatty acid in the heat exchanger 27 and cooling it therein, any water dissolved in the fatty acid under the high temperature and pressure existing in the column 1 separates out and is collected in separating tank 35, from which the water is drawn off through pipe 36 provided with valve 37. This water may be supplied to storage tank 44. The separated fatty acid is withdrawn from the tank 35 through pipe 38 provided with valve 39.

In the event that it is desired to effect hydrogenation within the column 1, the porous filtering masses 72 and 76 will be selected so as to provide not only an emulsion separating function but also a hydrogenation function and may, for example, for this purpose be composed of nickel wool or nickel splinters. Hydrogen is introduced into the column 1 for hydrogenation purposes through the pipe 10 and excess hydrogen will then be vented from the heat exchanger by operation of the valve 52 in the pipe 50.

The method of hydrolysis carried out in the apparatus shown in Fig. 3 is in general similar to the method of hydrolysis carried out in the apparatus of Fig. 1. Heated water is sprayed downwardly into the column 95 through the pipe 2 and spray 3 and heated oil is sprayed upwardly in the column 97 through the pipe 6 and spray 7. Glycerine solution is removed from the column 95 through pipes 100 and 101 and is sprayed downwardly in column 96 by spray 3a. In like manner glycerine solution is removed from the bottom of column 96 through pipe 102, passes through pipe 103 and is sprayed downwardly in column 97 from the spray 3b. The final and most concentrated glycerine solution is withdrawn from the bottom of column 97 through the pipe 104. The oil sprayed in the column 96 upwardly from the column 97 is converted into fatty acid by countercurrent flow in contact with the hot water being carried from one column to the other through the pipes 106 and 107, respectively, and being sprayed upwardly by the sprays 7a and 7b located in columns 96 and 95, respectively. The fatty acid product is withdrawn from the column 95 through the pipe 23. It will be noted that the apparatus of Fig. 3 provides nine splitting zones. Of course, hydrogen may be introduced into each of the columns 95, 96 and 97 for the same purpose and in substantially the same manner as shown in the description of the apparatus in Fig. 1, and in this case the porous filtering masses 72 and 76 will be chosen so as to constitute not only porous filtering media but also hydrogenation catalysts.

Now referring to that phase of the invention which involves pre-hydrogenation of the glyceride prior to hydrolysis and immediate transfer of the hydrogenated glyceride without cooling from the hydrogenation apparatus to the oil or fat splitting column, reference will be had to Figs. 2 and 4 which respectively show methods for concurrent and countercurrent pre-hydrogenation in conjunction with the immediately following glyceride splitting step.

Referring to Fig. 2, oil and hydrogen enter the column 80 through inlets 77 and 78, respectively, it being understood that the oil will be heated to a hydrogenation temperature. The oil and hydrogen pass upwardly in the column 80, that is, concurrently in that column, and pass similarly in column 83 and column 85, and the hydrogenated oil together with excess hydrogen pass into the column 86, the oil collecting in the lower part of the column and the hydrogen in the upper part. The hydrogen may be vented to a suitable place of disposal through the pipe 94 provided with valve 90, and the hot, hydrogenated oil is withdrawn from the bottom of the column 86 through the pipe 91 and pump 92 and immediately discharged into the splitting column 1 through the inlet 6.

In the pre-hydrogenation step the hydrogen and oil may flow counter-currently, and for this purpose the apparatus shown in Fig. 5 may be employed. In this apparatus oil flows into the column 108 through the pipe 112, then into the column 109 through the pipe 117 and then into the column 110 through the pipe 118 and finally out of the column 110 through the pipe 120 and will then be immediately discharged into the fat splitting column 1, as illustrated in Fig. 2. Hydrogen will be introduced into the column 110 through the pipe 126 and will pass through the respective columns counter-current to the oil, passing from column 110 through the pipe 127 to the column 109, from the column 109 through the pipe 128 to the column 108, and out of the column 108 through the pipe 114. It will be understood that the columns shown in Fig. 5 will be provided with hydrogenation catalytic means as, for example, as illustrated in Fig. 2.

I claim:

1. In the process of continuous counter-current hydrolysis of fat wherein a body of fat flows upwardly in a column against a downwardly flowing rain of water maintained under pressure in said column in the liquid phase at fat splitting temperatures and in which an emulsion composed of a fatty component and a glycerine-water component is formed; the improvement which comprises passing said emulsion in contact with a porous filtering medium and thereby separating said emulsion into its fatty component and its glycerine-water component at each of a plurality of stations in said column; arresting the upward flow of said separated glycerine-water component and causing it to pass downwardly from said station; whereby a plurality of separate fat splitting zones separated by said emulsion-separating stations are maintained in said column, the upward movement of said separated glycerine-water into each of said zones is prevented and the concentration and therefore the fat splitting activity of the water in each of said zones is thereby increased; and continuously passing fat, including said separated fatty component, from a lower zone into the next succeeding upper zone.

2. In the process of continuous counter-current hydrolysis of fat wherein a body of fat flows upwardly in a column against a downwardly flowing rain of water maintained under pressure in said column in the liquid phase at fat splitting temperatures and in which an emulsion composed of a fatty component and a glycerine-water component is formed; the improvement which comprises filtering said emulsion and thereby separating it into its fatty component and its glycerine-water component at each of a plurality of stations in said column; arresting the upward flow of said separated glycerine-water component and causing it to pass downwardly from said station; whereby a plurality of separate fat splitting zones separated by said emulsion-separating stations are maintained in said column, the upward movement of said separated glycerine-water into each of said zones is prevented and the concentration and therefore the fat splitting activity of the water in each of said zones is thereby increased; and continuously passing fat, including said separated fatty component, from a lower zone into the next succeeding upper zone.

3. In the process of continuous counter-current hydrolysis of fat wherein a body of fat flows upwardly in a column against a downwardly flowing rain of water maintained under pressure in said column in the liquid phase at fat splitting temperatures and in which an emulsion composed of a fatty component and a glycerine-water component is formed; the improvement which comprises passing said emulsion in contact with a porous filtering medium and thereby separating said emulsion into its fatty component and its glycerine-water component at each of a plurality of stations in said column; arresting the upward flow of said separated glycerine-water component and causing it to pass downwardly from said station; whereby a plurality of separate fat splitting zones separated by said emulsion-separating stations are maintained in said column, the upward movement of said separated glycerine-water into each of said zones is prevented and the concentration and therefore the fat splitting activity of the water in each of said zones is thereby increased; continuously passing fat, including said separated fatty component, from a lower zone into the next succeeding upper zone and mixing it with water in said upper zone by imparting a swirling movement to said fat, and collecting glycerine-water at each of said stations and spraying it downwardly into the ascending fat.

4. In the process of continuous counter-current hydrolysis of fat wherein a body of fat capable of hydrogenation flows upwardly in a column against a downwardly flowing rain of water maintained under pressure in said column in the liquid phase at fat splitting temperatures and in which an emulsion composed of a fatty component and a glycerine-water component is formed; the improvement which comprises passing said emulsion in contact with a porous filtering medium comprising a nickel hydrogenation catalyst and thereby separating said emulsion into its fatty component and its glycerine-water component, at each of a plurality of stations in said column; arresting the upward flow of said separated glycerine-water component and causing it to pass downwardly from said station; whereby a plurality of separate fat splitting zones separated by said emulsion-separating stations are maintained in said column, the upward movement of said separated glycerine-water into each of said zones is prevented and the concentration and therefore the fat splitting activity of the water in each of said zones is thereby increased; continuously passing fat, including said separated fatty component, from a lower zone into the next succeeding upper zone through said filtering medium; introducing hydrogen into said column and effecting hydrogenation of fat at each of said stations in addition to the above mentioned separation of fat from said emulsion.

BARUCH WINER.